Feb. 17, 1948.  R. C. ROBINSON  2,436,331
THREE-PHASE MOTOR WINDING
Filed Jan. 19, 1945  3 Sheets-Sheet 1
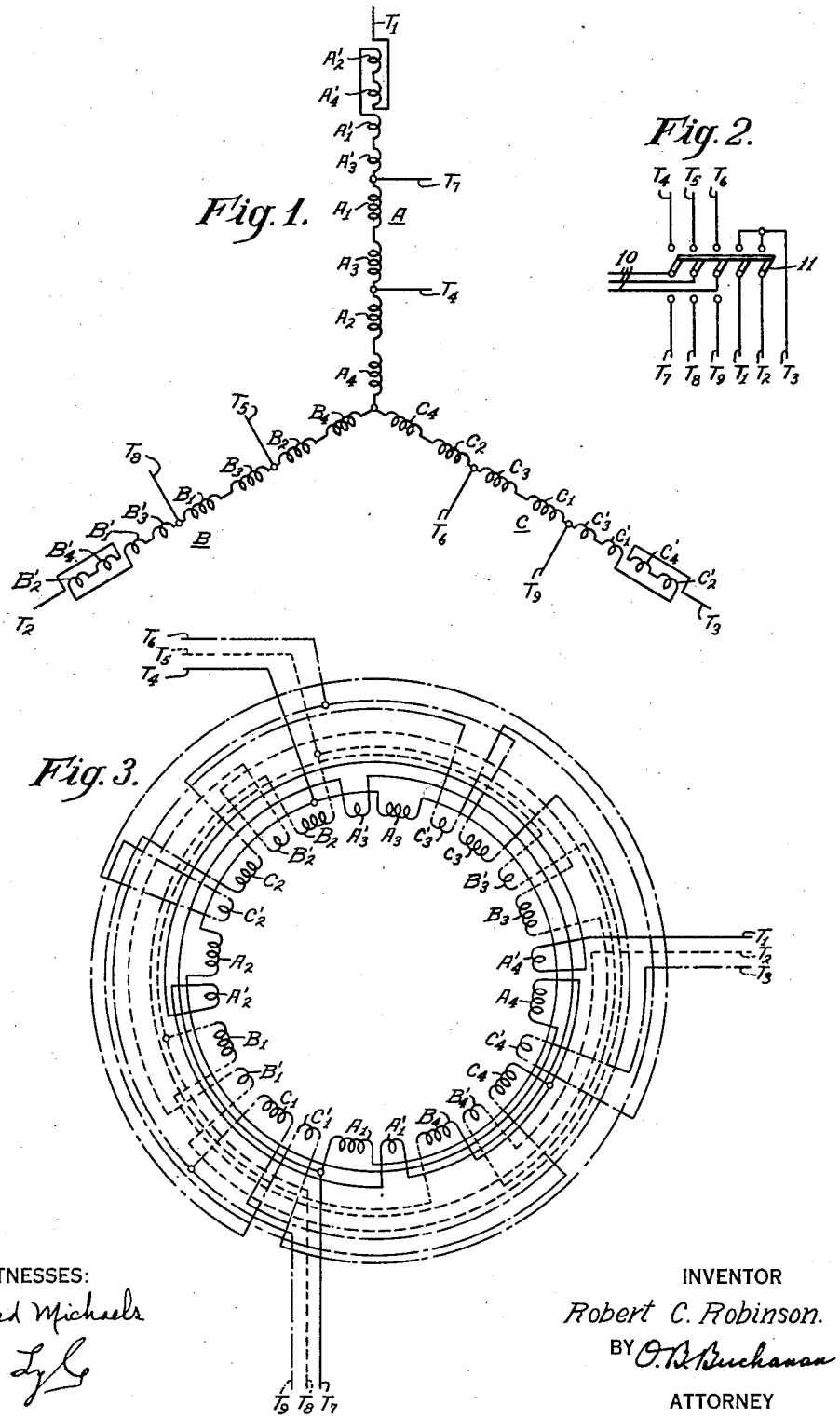
WITNESSES:
Edward Michaels
F. P. Lyle
INVENTOR
Robert C. Robinson.
BY O. B. Buchanan
ATTORNEY Feb. 17, 1948.   R. C. ROBINSON   2,436,331
THREE-PHASE MOTOR WINDING
Filed Jan. 19, 1945    3 Sheets-Sheet 2

WITNESSES:
Edward Michaels
F. P. Lyle

INVENTOR
Robert C. Robinson.
BY O. B. Buchanan
ATTORNEY

Feb. 17, 1948.   R. C. ROBINSON   2,436,331
THREE-PHASE MOTOR WINDING
Filed Jan. 19, 1945   3 Sheets-Sheet 3

WITNESSES:
Edward Michaels
F. P. Lyle

INVENTOR
Robert C. Robinson.
BY O.B.Buchanan
ATTORNEY

Patented Feb. 17, 1948

2,436,331

UNITED STATES PATENT OFFICE 2,436,331

THREE-PHASE MOTOR WINDING

Robert C. Robinson, Pittsburgh, Pa., assignor to Westinghouse Electric Corporation, East Pittsburgh, Pa., a corporation of Pennsylvania Application January 19, 1945, Serial No. 573,573

13 Claims. (Cl. 318—224)

The present invention relates to the stator or armature windings of electric motors and, more particularly, to an improved armature winding for a three-phase, two-speed alternating-current motor.

Two speed motors of the type to which this invention relates are provided with armature windings which are arranged so that the connections can be changed to change the number of poles, and thus change the speed of the motor. In one well-known winding arrangement of this type, the winding consists of a suitable number of groups of coils disposed in the slots of the armature core, with the coil groups connected in three phase windings, and with the coil groups of each phase winding connected in series in two branches. A tap connection is provided at the midpoint of each phase winding, between the two branches, and the connections between coil groups are made so that the coil groups of one branch of each phase winding alternate with the coil groups of the other branch.

The phase windings are permanently connected in star and, in the low-speed connection, the free ends of the three phase windings are connected to a three-phase supply line, the tap connections being open, so that the coil groups of each phase winding are all in series, and the instantaneous direction of current flow is the same in all the coils of each phase winding, thus giving a winding with a number of poles equal to twice the number of coil groups, or, in general, a $4n$-pole winding. In the high-speed connection of such a winding, the tap connections are connected to the supply line and the free ends of the phase windings are connected together, forming, in effect, a parallel-star arrangement with the coil groups of one branch of each phase winding reversed, with respect to the external circuit, so that the instantaneous direction of current flow is in opposite directions in adjacent coil groups of each phase winding, thus forming a winding with a number of poles equal to the number of coil groups, or, in general, a $2n$-pole winding. This type of winding has the advantage of relative simplicity, both of internal connections and of the external switching or control equipment required to change from one speed to the other.

In the usual design of windings of this type, the coil groups are arranged and connected so as to form phase belts covering 60° in the high-speed connection and 120° in the low-speed connection. The throws, or coil pitch, of the coils is necessarily a compromise, and the coils are usually wound with a coil pitch of 2/3 in the high-speed connection, which corresponds to a pitch of 4/3 in the low-speed connection, with twice as many poles. When the winding is connected for low-speed operation, the overpitched coils, in combination with the 120° phase belts, produce a nonsinusoidal magnetomotive force wave, which includes a large second harmonic component. This, of course, produces a second harmonic flux wave in the air gap, which rotates negatively, that is, in the opposite direction to the rotation of the rotor, and produces a negative torque which reduces the net torque developed by the motor. The magnitude of this negative torque is somewhat increased compared to that of the fundamental torque, because of the fact that the second harmonic flux has no net linkage with the field winding, and is, therefore, not reduced on the direct axis by the effect of field reactance. This reduced value of low-speed starting torque, as compared to the starting torque available in the high-speed connection, is a serious disadvantage in many applications, and frequently makes it necessary to build a larger machine, with a consequent increase in cost and also with an undesirably large low-speed starting current.

The low-speed starting performance might be improved by reducing the pitch of the coils, to reduce the magnitude of the second harmonic flux component, but such a reduction in pitch would have the effect of increasing the flux density in the high-speed connection. The increased flux density on high speed would have no advantage, since the motor was already capable of producing more torque than required at high speed, and it would have the serious disadvantage of increasing the inrush current at transfer to high speed, and would also increase the core loss, which would considerably reduce the high-speed efficiency.

The principal object of the present invention is to provide an armature winding for two-speed, three-phase alternating-current motors, in which better starting performance on low speed can be obtained than has previously been possible without adversely affecting the characteristics of the motor on high speed.

Another object of the invention is to provide an armature winding for two-speed, three-phase motors, in which the throw or pitch of the coils can be made small enough to reduce the second harmonic component of the flux wave on low speed without making the high-speed flux density undesirably high.

A more specific object of the invention is to provide a two-speed, three-phase motor winding of the type described above, in which the flux density at low speed is increased relative to the high-speed flux density, so that the pitch of the coils can be reduced to improve the low-speed starting performance, without making the high-speed flux density too high.

This result is obtained, in accordance with the invention, by arranging the winding so that certain coils, of at least some of the coil groups, are cut out when the winding is connected for low-speed operation. Since the internal voltage of the motor must always balance the applied voltage, it follows that the total flux must remain the same, and, with some coils cut out of the circuit, the flux density will be greater. Thus, it is possible to design the winding with a shorter coil pitch than has previously been possible, to obtain the desired low-speed starting torque, and because of the increased low-speed flux density, no undue increase in the high-speed flux density is required.

The invention will be more fully understood from the following detailed description, taken in connection with the accompanying drawings, in which:

Figure 1 is a wiring diagram, showing the arrangement of an armature winding embodying the invention;

Fig. 2 is a diagram showing the switching arrangement for changing the number of poles of the winding of Fig. 1;

Fig. 3 is a schematic diagram, showing the actual connections of a winding such as shown in Fig. 1;

Figure 4:
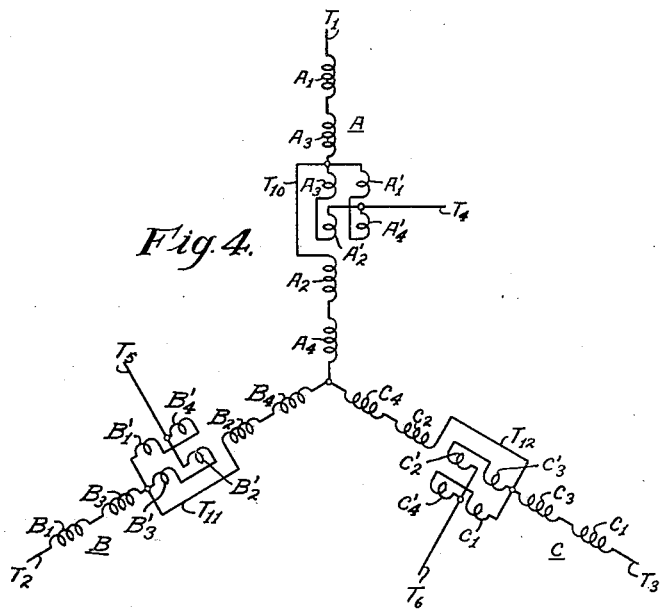
Fig. 4 is a wiring diagram showing the connections of a winding embodying a modified form of the invention, with the winding shown in the low-speed connection.

A typical three-phase motor winding embodying the invention is shown in Figs. 1, 2, and 3. The winding shown is connectible to have either four or eight poles, but it will be understood that the invention is applicable to windings having any number of poles or, in general, to windings which are connectible to have either $2n$ or $4n$ poles. As shown in the drawing, the winding is a three-phase winding, consisting of three phase windings which are designated A, B, and C, respectively. Each of the phase windings in the illustrated embodiment consists of four coil groups, designated A1—A4, B1—B4, and C1—C4, respectively. Each of the coil groups includes a suitable number of coils arranged in any suitable manner in the slots of the armature core, and preferably wound with a coil pitch of less than 4/3 in the low-speed connection of the winding. One or more coils of each of the coil groups are separately connected to form subgroups which are designated A1'—A4', B1'—B4', and C1'—C4', respectively. As shown in Fig. 3, the coil groups of the three phase windings follow each other in succession around the armature core, in accordance with the desired phase rotation, in the usual manner.

The coil groups of each phase winding are connected in series, and tap connections leading to terminals T4, T5, and T6, respectively, are provided at the midpoint of each phase winding, dividing the phase winding into two branches. It will be noted from Fig. 3 that the connections are so made that the coil groups of one branch of each phase winding alternate with the coil groups of the other branch of the phase winding. Thus, the odd-numbered coil groups in each case are connected in one branch of the phase winding, and the even-numbered coil groups in the other branch. The subgroups A1'—A4', B1'—B2', and C1'—C4' in each phase winding are connected in series between the main coil groups and the terminals T1, T2, and T3, respectively, and tap connections leading to terminals T7, T8, and T9, respectively, are provided between the subgroups and the main coil groups in each phase winding, as clearly shown in Fig. 1. It will also be noted that the connections of the subgroups of one branch of each phase winding are reversed with respect to the subgroups of the other branch of the phase winding. The three phase windings are permanently connected together in star.

It will be seen that the motor has nine terminals which may be connected to each other and to a three-phase supply line 10 by means of a switch 11, or any equivalent switching or control device. For low-speed operation, the switch 11 is moved to its lower position, as seen in Fig. 2, in which the terminals T7, T8, and T9 are connected to the line, and the terminals T1, T2, T3, T4, T5, and T6 are open. In this connection, the coil subgroups are cut out of the circuit and the main coil groups only are included. Since the coil groups of each phase winding are all in series between the terminals T7, T8, and T9, respectively, and the neutral point, the instantaneous direction of current flow is the same in all the coil groups of each phase winding, and the winding has a number of poles equal to twice the number of coil groups, or eight poles in the embodiment shown.

For high-speed operation, the switch 11 is thrown to its upper position, in which the terminals T4, T5, and T6 are connected to the line, and the terminals T1, T2, and T3 are connected together. It will be apparent from Fig. 1 that the effect of this is to change the connection to a parallel-star arrangement, with the two branches of each phase winding in parallel, the terminals T1, T2, and T3 being connected together to form a neutral point. In this connection, the odd-numbered coil groups in Fig. 1 are reversed, with respect to the external circuit, so that the instantaneous direction of current flow is reversed in these coil groups, and the direction of current flow in adjacent coil groups of each phase winding is therefore in opposite directions, so that the winding now has only half as many poles as in the low-speed connection, or four poles in the illustrated embodiment. It will also be seen that, in the high-speed connection, the subgroups, A1'—A4', B1'—B4', and C1'—C4' are connected in series with one branch of their respective phase windings. Since all four subgroups of each phase winding are in series with one branch of the phase winding, the connections of the subgroups corresponding to coil groups in the other branch of the winding must be reversed, as shown, so as to obtain the proper direction of current flow.

The effect of cutting out one or more turns of each coil group on the low-speed connection is to increase the flux density on the low-speed connection relative to the flux density on the high-speed connection. This necessarily follows because of the fact that the internal voltage of the motor must balance the applied voltage under all conditions, which means that the total flux must remain the same. By cutting out some of the coils, therefore, the flux density resulting from the reduced number of coils left in the circuit must be greater, and thus the flux density on low speed is increased relative to the high-speed flux density, as compared to the relative values obtained in the conventional connection in which the same number of coils remain in circuit in both high and low-speed connections.

Because of the relatively increased low-speed flux density, the starting performance at low speed can be materially improved over that obtainable with conventional windings, without impairing the high-speed performance. Thus, the pitch of the coils may be made considerably less than ⅔ at low speed in order to reduce the second harmonic component of the flux, and thus reduce the negative torque, so as to obtain a greater net starting torque at low speed, without unduly increasing the low-speed starting current. The low-speed flux density is high enough, because of the effect of cutting out coils, to obtain the desired starting torque, without requiring the high-speed flux density to be so high as to unduly increase the high-speed inrush current or core loss. In other words, the machine can be designed to have a high-speed flux density which is kept within the usual limits, even with a much shorter coil pitch than has been customary, without making the low-speed flux density too low for the desired starting torque, because of the relative increase in low-speed flux density obtained by cutting out certain coils of the winding in the low-speed connection.

In the embodiment of the invention shown, one or more coils are cut out on low speed from each of the coil groups. It is not always necessary, however, especially if a relatively large number of coil groups is used, to cut out coils from each of the coil groups, and it is frequently sufficient to cut out coils of only some of the coil groups, which should be selected so that the coils cut out are symmetrically disposed about the motor in order to obtain a properly balanced condition for low-speed operation.

In the embodiment of the invention just described and shown in Figs. 1 to 3, it is necessary to bring out nine leads from the motor and carry them to the external switch or control device, as shown in Fig. 2. In many cases, this is a serious disadvantage, since the control may be located at some distance from the motor, and it is often undesirable to carry so many leads for a considerable distance.

Another embodiment of the invention is shown in Figs. 4 to 7, in which only six leads are required from the motor to the control device, which is the same number of leads as required by the conventional two-speed motors of the prior art. In this embodiment of the invention, as shown more particularly in Fig. 7, the coil groups are arranged, in general, in the same manner as in Figs. 1 and 3, and certain coils of each coil group are separately connected in subgroups in the same manner, the same designations being used for the coil groups and subgroups.

Figure 5:
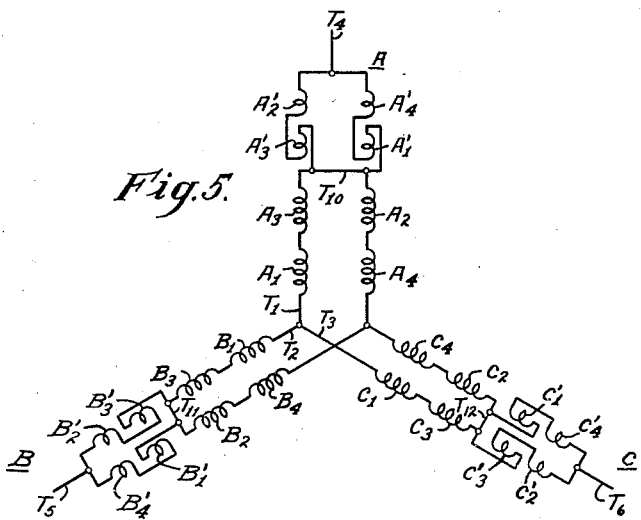
Fig. 5 is a wiring diagram showing the winding of Fig. 4 in the high-speed connection.

In this embodiment of the invention, however, the subgroups A1'—A4', B1'—B4', and C1'—C4' are not connected in series between the phase windings and terminals T1, T2, and T3, as in the previous embodiment of the invention, but are connected in the tap connections which divide the phase windings into two branches. In this way, the necessity for the tap connections T7, T8, and T9 of Figs. 1 and 3 is eliminated. As shown in Figs. 4 and 5, the subgroups A1' and A4', for example, are connected in series and the subgroups A2' and A3' are connected in series. The two series-connected pairs of subgroups are connected in parallel between the terminal T4 of the tap connection and the internal connection T10 which joins the two branches of the phase winding A. The subgroups of phase winding B are connected in a similar manner between the terminal T5 of the tap connection at the midpoint of the phase winding and the internal connection T11, and the subgroups of phase winding C are similarly connected between the terminal T6 of the midpoint tap connection and the internal connection T12.

Figure 6:
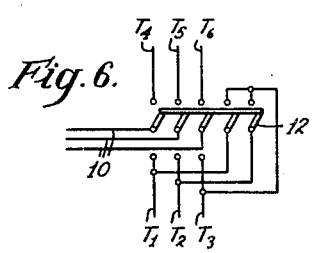
Fig. 6 is a diagram showing the switching arrangement for changing the number of poles of the winding of Figs. 4 and 5.
Figure 7:
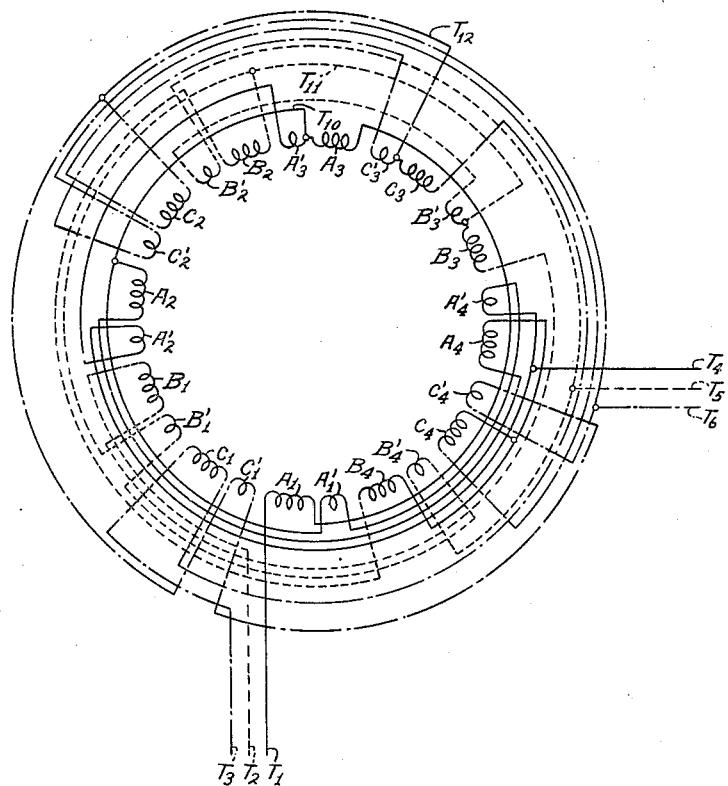
Fig. 7 is a schematic diagram, showing the actual connections of an illustrative winding of the type shown in Figs. 4 and 5.

In the low-speed connection of the winding, shown in Fig. 4, the switch 12 of Fig. 6 is in its lower position, and the terminals T1, T2, and T3 are connected to the line 10, the terminals T4, T5, and T6 being open, so that the subgroups are cut out of the circuit and the main coil groups only are energized, giving a low-speed connection which is essentially the same as that described above in connection with Figs. 1 and 3.

For high speed operation, the switch 12 of Fig. 6 is moved to the upper position, in which the terminals T4, T5, and T6 are connected to the line 10, and the terminals T1, T2, and T3 are connected together. This results in the parallel-star connection shown in Fig. 5, in which the connections of the odd-numbered coil groups to the external circuit have been reversed, so that a winding of half the number of poles is formed, and the subgroups are included in the circuit. The necessity for the parallel connection of the subgroups in the tap connections T4, T5, and T6 will be apparent from Fig. 5, since the current flowing through these connections divides between the two branches of each phase winding, and it is necessary, therefore, to connect the subgroups in the manner shown, so that each subgroup will carry the same current as its main coil group, and in the same direction, as will be clear from the actual winding connections shown in Fig. 7.

It will be apparent that the electrical relations of the winding of Figs. 4 to 7 are the same as those of the embodiment of the invention shown in Figs. 1 to 3, and that the effect in improving the low-speed starting performance is the same. This embodiment of the invention has the advantage, however, of requiring only six external leads instead of the nine required in the embodiment of Figs. 1 to 3. This is a material advantage in many cases, although it may be somewhat offset by the increased complication of the internal connections of the winding.

It should now be apparent that an improved armature winding has been provided for three-phase, two-speed electric motors. This winding is suitable for either synchronous or asynchronous machines, and it makes it possible to materially improve the low-speed starting performance, without sacrificing any of the characteristics of the high-speed performance. Certain preferred embodiments of the invention have been shown and described for the purpose of illustration, but it is to be understood that the invention is not limited to these specific arrangements, and in its broadest aspects, it includes all equivalent embodiments and modifications which come within the scope of the appended claims.

I claim as my invention:

1. A winding for a three-phase, two-speed electric motor, said winding including three-phase windings, each of said phase windings comprising a plurality of coil groups, means for connecting the coil groups of each phase winding to form a winding of $2n$ poles, and means for alternatively connecting all the coil groups of each phase winding to form a winding of $4n$ poles, said last-mentioned connecting means being arranged so that some coils of at least some of the coil groups are omitted from the circuit.

2. A winding for a three-phase, two-speed electric motor, said winding including three phase windings, each of said phase windings comprising a plurality of coil groups, means for connecting the coil groups of each phase winding to form a winding of $2n$ poles, and means for alternatively connecting all the coil groups of each phase winding to form a winding of $4n$ poles, said last-mentioned connecting means being arranged so that some coils of at least some of the coil groups are omitted from the circuit, and the coil pitch being less than 4/3 in the $4n$-pole connection.

3. A winding for a three-phase two-speed electric motor, said winding including three phase windings, each of said phase windings comprising a plurality of coil groups, means for connecting the coil groups of each of said phase windings to form a winding of $4n$ poles, the connections being made so that some coils of at least some of the coil groups are omitted from the circuit, and means for alternatively connecting the coil groups of each of said phase windings with alternate coil groups reversed, with respect to the external circuit, to form a winding of $2n$ poles, all coils of all of the coil groups being included in the circuit.

4. A winding for a three-phase, two-speed electric motor, said winding including three phase windings, each of said phase windings comprising a plurality of coil groups, means for connecting the coil groups of each of said phase windings to form a winding of $4n$ poles, the connections being made so that some coils of at least some of the coil groups are omitted from the circuit, and means for alternatively connecting the coil groups of each of said phase windings with alternate coil groups reversed, with respect to the external circuit, to form a winding of $2n$ poles, all coils of all of the coil groups being included in the circuit, the coil pitch being less than 4/3 in the $4n$-pole connection.

5. A winding for a three-phase, two-speed electric motor, said winding including three phase windings, each of said phase windings comprising a plurality of coil groups, at least some of said coil groups including a separately connectible subgroup, means for connecting the coil groups of each of said phase windings to form a winding of $4n$ poles with said subgroups omitted from the circuit, and means for alternatively connecting the coil groups and subgroups of each of said phase windings to form a winding of $2n$ poles.

6. A winding for a three-phase, two-speed electric motor, said winding including three phase windings, each of said phase windings comprising a plurality of coil groups, at least some of said coil groups including a separately connectible subgroup, means for connecting the coil groups of each of said phase windings without said subgroups to form a winding of $4n$ poles, and means for alternatively connecting the coil groups and subgroups of each phase winding with alternate coil groups reversed, with respect to the external circuit, to form a winding of $2n$ poles.

7. A winding for a three-phase, two-speed electric motor, said winding including three phase windings, each of said phase windings comprising a plurality of coil groups, at least some of said coil groups including a separately connectible subgroup, means for connecting the coil groups of each of said phase windings without said subgroups to form a winding of $4n$ poles, and means for alternatively connecting the coil groups and subgroups of each phase winding with alternate coil groups reversed, with respect to the external circuit, to form a winding of $2n$ poles, the coil pitch being less than 4/3 in the $4n$-pole connection.

8. A winding for a three-phase, two-speed electric motor, said winding including three star-connected phase windings, each of said phase windings comprising a plurality of coil groups, some of the coils of at least some of said coil groups being separately connected to form subgroups, means for connecting together the coil groups of each phase winding, means for separately connecting together the subgroups of each phase winding, means for connecting the coil groups of each phase winding in series with the subgroups of the phase winding, a tap connection between the coil groups and subgroups of each phase winding, means for connecting said tap connections to a three-phase supply line to effect connection of the winding as a $4n$-pole winding with the subgroups omitted from the circuit, and other connection means for effecting connection of the coil groups and subgroups of each phase winding to said supply line to effect connection of the winding as $2n$-pole winding.

9. A winding for a three-phase, two-speed electric motor, said winding including three star-connected phase windings, each of said phase windings comprising a plurality of coil groups, some of the coils of at least some of said coil groups being separately connected to form subgroups, means for connecting together the coil groups of each phase winding, means for separately connecting together the subgroups of each phase winding, means for connecting the coil groups of each phase winding in series with the subgroups of the phase winding, a first tap connection between the coil groups and subgroups of each phase winding, a second tap connection in each phase winding dividing the coil groups in each phase winding into two branches, the coil groups of one branch alternating with the coil groups of the other branch, means for connecting said first tap connections to a three-phase supply line to effect connection of the winding as a $4n$-pole winding with the subgroups omitted from the circuit, and means for alternatively connecting said second tap connections to said supply line and for connecting the subgroups of all the phase windings together to form a parallel-star, $2n$-pole winding with all the coil groups and subgroups in circuit.

10. A winding as defined in claim 8 in which the coils are wound with a coil pitch less than 4/3 in the $4n$-pole connection.

11. A winding for a three-phase, two-speed electric motor, said winding including three star-connected phase windings, each of said phase windings comprising a plurality of coil groups, some of the coils of at least some of said coil groups being separately connected to form subgroups, means for connecting together the coil groups of each phase winding without the subgroups, means for connecting together the subgroups of each phase winding, a tap connection in each phase winding dividing the coil groups in each phase winding into two similar branches, the coil groups of one branch alternating with those of the other, means for connecting the subgroups of each phase winding in series in the tap connections of the respective phase windings, means for connecting said two branches of each phase winding in series to a three-phase supply line to effect connection of the winding as a $4n$-pole winding with said subgroups omitted from the circuit, and means for alternatively connecting said tap connections to the supply line and for connecting together the coil groups of the phase windings to form a parallel-star, $2n$-pole winding with all the coil groups and subgroups in circuit.

12. A winding for a three-phase, two-speed electric motor, said winding including three star-connected phase windings, each of said phase windings comprising a plurality of coil groups, some of the coils of at least some of said coil groups being separately connected to form subgroups, means for connecting together the coil groups of each phase winding without the subgroups, means for connecting together the subgroups of each phase winding in two parallel branches, a tap connection in each phase winding dividing the coil groups in each phase winding into two similar branches, the coil groups of one branch alternating with those of the other, means for connecting the subgroups of each phase winding in series in the tap connections of the respective phase windings, means for connecting said two branches of each phase winding in series to a three-phase supply line to effect connection of the winding as a $4n$-pole winding with said subgroups omitted from the circuit, and means for alternatively connecting said tap connections to the supply line and for connecting together the coil groups of the phase windings to form a parallel-star, $2n$-pole winding with all the coil groups and subgroups in circuit.

13. A winding as defined in claim 11 in which the coils are wound with a coil pitch less than ⅔ in the $4n$-pole connection.

ROBERT C. ROBINSON.

REFERENCES CITED

The following references are of record in the file of this patent:

UNITED STATES PATENTS

| Number | Name | Date |
| --- | --- | --- |
| 1,418,779 | Creedy | June 6, 1922 |
| 1,499,853 | Creedy | July 1, 1924 |
| 1,356,936 | Macmillan | Oct. 26, 1920 |
| 1,992,050 | Alger | Feb. 19, 1935 |